United States Patent Office 3,711,532
Patented Jan. 16, 1973

3,711,532
PREPARATION OF BETA-HALOGENO-PROPIONITRILES
Colin Hewlett, Midland Park, and Charles N. Winnick, Teaneck, N.J., assignors to Halcon International, Inc.
No Drawing. Filed Oct. 20, 1969, Ser. No. 867,898
Int. Cl. C07c 21/16
U.S. Cl. 260—465.7          14 Claims

ABSTRACT OF THE DISCLOSURE

Beta-halogenopropionitriles and their alpha-alkyl derivatives are prepared by reacting aqueous solutions of a hydrogen halide and the nitrile with the continuous removal of water from the reaction zone. The reaction may also be carried out in the presence of an inert solvent with water removed from the reaction zone by distillation as the azeotrope with the nitrile and/or inert solvent.

BACKGROUND OF THE INVENTION

Prior to the present invention beta-halogenopropionitriles have been prepared by reacting anhydrous hydrogen halide gas with acrylonitrile or its alpha-alkyl derivatives. United States Patent 2,524,020 is representative of this art and discloses the reaction in the presence of an amine catalyst.

The reaction of aqueous solutions of hydrogen halides such as hydrochloric acid and hydrobromic acid, with nitriles is known to yield hydrolysis products such as the acid or amide corresponding to the nitriles.

Fieser and Fieser, in their treatise, "Reagents for Organic Synthesis" (1967) on pages 450–451, describe the use of aqueous hydrobromic acid as a reagent for the hydrolysis of nitriles to acids. Hydrobromination of 2-amino-2-methyl propionitrile gives the corresponding acid and 3-hydroxypropionitrile gives 3-bromopropionic acid.

Aqueous hydrochloric acid is known to react with acrylonitrile to give either the amide as described in U.S. Pat. 2,535,245 or the acid as described in U.S. Pat. 1,851,040.

The processes disclosed using anhydrous hydrogen halide gas to prepare beta-halogenopropionitriles are inconvenient, especially when aqueous hydrogen halide is available because aqueous solutions of the hydrogen halides can only be concentrated by simple distillation to their constant boiling mixtures.

Therefore, it is an object of the present invention to provide an improved process for the preparation of beta-halogenopropionitriles.

It is a further object of the present invention to provide an improved process for the preparation of beta-halogenopropionitriles utilizing aqueous solutions of hydrogen halides as the halogen source.

SUMMARY OF THE INVENTION

According to the present invention, it has been found that beta-halogenopropionitriles and their alpha-alkyl derivatives may be obtained in excellent selectivities by reacting acrylonitrile or an alpha-alkyl derivative with an aqueous solution of a hydrogen halide. The aqueous hydrogen halide is preferably reacted with an excess of the boiling nitrile while simultaneously removing water from the reaction zone. In an especially preferred embodiment of the invention, water is removed as an azeotrope with the nitrile or as an azeotrope with the nitrile and/or an inert solvent.

DETAILED DESCRIPTION OF THE INVENTION

In accordance with the present invention, there is provided a process for preparing beta-halogenopropionitriles and their alpha-alkyl derivatives by reacting acrylonitrile or an alpha-alkyl derivative with an aqueous solution of a hydrogen halide. It is an advantage of the instant discovery that an aqueous solution of the hydrogen halide can be used directly in the process. The hydrogen halides are frequently available in aqueous form and can only be concentrated by simple distillation to their constant boiling mixtures.

The preferred reactions encompassed by the instant discovery are the reactions of acrylonitrile with an aqueous solution of hydrogen chloride and acrylonitrile with an aqueous solution of hydrogen bromide. The corresponding beta-halogenopropionitriles prepared by the two preferred reactions are beta-chloropropionitrile and beta-bromopropionitrile. The following detailed description of the invention will describe the reaction of acrylonitrile, although it is understood that our invention encompasses the alpha-alkyl derivatives as well.

The concentration of the aqueous solution of the hydrogen halide which can be employed in the process may vary over a wide range. The solution may be very dilute or may approach the solubility limit of the hydrogen halide in water at the temperature it is to be used. However, it is preferred that the concentration approach that of the constant boiling mixture so there is less water which must be removed from the reaction zone. It is always possible to achieve this acid concentration by simple distillation prior to reaction. Thus, the concentration of the hydrochloric acid prior to reaction with the nitrile may be in the range of from about 1 to about 45%, preferably about 5 to about 25% and most preferably from about 10 to about 20% by weight. For the reaction with hydrobromic acid, the concentration of the acid can vary from about 1% to about 70%, preferably from about 20 to 60% and most preferably from 40 to 48% by weight. Gaseous mixtures of the hydrogen halide and water may also be employed.

The reaction of acrylonitrile or its alpha-alkyl derivatives and a hydrogen halide to a beta-halogenopropionitrile can be represented by the following formula:

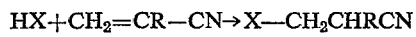

$$HX + CH_2=CR-CN \rightarrow X-CH_2CHRCN$$

wherein R is H for acrylonitrile, and an alkyl group for the alpha-alkyl derivatives. Preferred alpha-alkyl derivatives of acrylonitrile are the lower alkyl derivatives, such as, alpha-methyl acrylonitrile.

Preferably the reaction is carried out with a stoichiometric excess of acrylonitrile. The molar ratio of acrylonitrile to hydrogen halide may vary from about 1.0 to about 50 and preferably from about 1.5 to about 25. In the most preferred embodiments of the invention, the molar ratio is from about 2 to about 10.

If the reaction is carried out in a continuous manner utilizing a tower reactor with the vapor effluent comprising acrylonitrile and water condensed and decanted with total reflux of the condensed organic phase, the overall molar ratio of acrylonitrile to acid in the feed need only be about 1.0 or slightly above, but it may be as high as 10. In such a system employing total reflux of the condensed organic phase, the acrylonitrile dissolved in the condensed aqueous phase (about 7 percent) must be replaced. Generally, this loss of acrylonitrile will be recovered from the aqueous phase and used as recycle.

The temperature of the reaction may vary from about −20° to about 120° C. and preferably is maintained between about 30° C. and about 100° C. The partial pressure of the reactants and water in the reaction zone is not critical and may vary from about 50 mm. Hg to atmospheric pressure. Any desired total pressure may be maintained by the presence of inert diluent gases such as nitrogen, methane, hydrogen, etc. When setting the temperature and pressure of a reaction zone, suitable conditions must be dictated so that the water can be removed as a vapor.

The reaction may also be carried out in the presence of an inert organic solvent such as a hydrocarbon. Especially preferred are those solvents which form a volatile azeotrope with the acrylonitrile and water, such as benzene, propionitrile, toluene, hexane, carbon tetrachloride, xylene and ethyl acetate. When such an inert solvent is used, the solvent may be present in amounts from about 0.1 to 99 moles of solvent per mole of acrylonitrile.

The reaction may be carried out batchwise in a well-stirred reaction zone with the slow addition of the aqueous solution of the hydrogen halide to the boiling acrylonitrile. During the addition of the aqueous solution of the hydrogen halide to the reaction zone, water is simultaneously removed as the acrylonitrile-water azeotrope. While these results are adequate, it has been discovered that much higher selectivities to the desired beta-halogenopropionitrile can be obtained when the reaction is carried out in a continuous fashion.

In a preferred embodiment of the invention, when the reaction is carried out in a continuous manner, a distillation column may be used as the reaction zone, with the reaction occurring on the plates of the column. For example, acrylonitrile may be fed to the still pot and allowed to boil until the decanter is full and reflux begins with the aqueous solution of the hydrogen halide then fed to the middle of the column. The high-boiling beta-halogenopropionitrile moves down the column into the still pot and the acrylonitrile-water azeotrope distills up from the reaction zone and rectifies in the top section of the distillation column. The distillate separates into two phases upon condensing and at least a portion of the upper phase, containing about 97 weight percent acrylonitrile, is returned to the top of the column as reflux. The lower aqueous phase is removed and may be further treated for removal of the contained organics. Acrylonitrile may conveniently be continuously added anywhere below the feed point for the aqueous hydrogen halide, such as, to the still pot. The product beta-halogenopropionitrile is collected by withdrawing a stream from the still pot which comprises a mixture of acrylonitrile and beta-halogenopropionitrile, and is separated by simple distillation, with recycle of the acrylonitrile.

When an inert solvent is used in the continuous process, the solvent may be added at any convenient point, however, it is preferably fed into the system with the acrylonitrile. During steady state operation the solvent may be maintained in the reaction zone by appropriate selection of the still pot temperature and pressure.

The following examples serve to illustrate the present discovery and are not intended to limit the scope of our invention in any manner. All percentages given are by weight, based on the total weight, unless otherwise specified.

EXAMPLES I–IV

Beta-bromopropionitrile was prepared by reacting acrylonitrile and a 48 weight percent aqueous solution of hydrobromic acid in the following apparatus. The reactor column comprises two one-inch Oldershaw distillation columns, each containing 20 plates, set one atop the other with the hydrobromic acid feed between the two Oldershaw columns. The reactor column was equipped with a 500 milliliter still pot set in an oil bath and an overhead condenser. The condensed material was fed to a decanter packed in ice with provision for returning the upper organic layer to the top plate of the reactor. Both head and still pot thermometers were provided.

Acrylonitrile was charged to the still pot and permitted to boil until the decanter (maintained at 0° C.) was full and reflux began. At that time the aqueous hydrobromic acid feed was started.

The following table indicates the initial charge of acrylonitrile, the acid flow rate, temperatures and the selectivities to beta-bromopropionitrile obtained. In each case the column pressure was atmospheric. When benzene was used, it was introduced into the still pot with the acrylonitrile.

In each example the product beta-bromopropionitrile is separated from the reaction product by simple distillation.

TABLE

| Example | Acrylonitrile charge, grams | Acid feed rate, ml./hr. | Pot temperature, °C. | Head temperature, °C. | Mole percent selectivity acrylonitrile to— Product | Mole percent selectivity acrylonitrile to— Hydrolysis products |
|---|---|---|---|---|---|---|
| I | 213 | 30 | 77–125 | 78–82 | 99.4 | 0.6 |
| II | [1] 125 | 18.6 | 78–82 | 71–72 | 98.5 | 1.5 |
| III | [1] 125 | 30.8 | 78–80.5 | 71–72 | 99.3 | 0.7 |
| IV | [2] 220 | 17.9 | 78–80.5 | 71–72 | 98.9 | 1.1 |

[1] A reaction charge of 1 mole benzene per mole acrylonitrile was used (185 grams benzene).
[2] A reaction charge of 0.25 mole benzene per mole acrylonitrile was used (90 grams benzene).

Continuous operation is demonstrated by the following example.

EXAMPLE V

Into the still pot of a 10″ diameter glass column packed with ½″ carbon Raschig Rings and equipped with a reflux condenser and decanter, is fed a gaseous mixture of 0.682 mole per hour of hydrogen bromide and 1.31 moles per hour of water. Also added is 0.8 mole per hour of liquid acrylonitrile as a 90 mole percent stream, the contaminants being 0.05 mole per hour beta-bromopropionitrile and inert nitriles. The total pressure in the column is maintained at one atmosphere with hydrogen.

A temperature of 90° C. is maintained in the still pot and 50° C. in the condenser. The calculated partial pressure of reactants plus water is 200 mm. Hg.

The overhead condensate is decanted with the organic phase returned to the top of the column as reflux. A beta-bromopropionitrile product stream is continuously removed from the still pot and an aqueous purge is taken from the lower phase in the decanter. These two streams have the following flow rates:

| Component | Moles per hour Product stream | Moles per hour Aqueous purge |
|---|---|---|
| H₂O | 0.05 | 1.2 |
| Acrylonitrile | 0.09 | 0.04 |
| Beta-bromopropionitrile | 0.73 | |
| Inerts | 0.04 | |

The beta-bromopropionitrile is separated from the product stream by simple distillation.

The beta-halogenopropionitriles prepared by the process of the invention are useful as starting materials in dimerization reactions. For example, beta-bromopropionirtile and beta-chloropropionitrile are particularly useful in the dimerization to adiponitrile.

The embodiments of the invention in which an exclusive property is claimed are defined as follows:

1. A process for the preparation of a beta-halogenopropionitrile which comprises reacting a nitrile selected from the group consisting of acrylonitrile and its alpha-lower alkyl derivatives with a hydrogen halide selected from the group consisting of hydrogen chloride and hydrogen bromide in the presence of a solvent selected from the group consisting of water and mixtures of water with an inert organic solvent which forms an azeotrope with water and with the said nitrile and continuously removing water during the reaction as an azeotrope with the said nitrile.

2. A process for the preparation of a beta-halogenopropionitrile as defined in claim 1, wherein the nitrile is acrylonitrile.

3. The process of claim 2 wherein the aqueous solution of a hydrogen halide is hydrochloric acid.

4. The process of claim 2 wherein the aqueous solution of a hydrogen halide is hydrobromic acid.

5. A process for the preparation of a beta-halogenopropionitrile which comprises reacting acrylonitrile with an aqueous solution of a hydrogen halide selected from the group consisting of hydrogen chloride and hydrogen bromide and continuously removing water during the reaction as the acrylonitrile-water azeotrope.

6. The process of claim 5 wherein the aqueous solution of a hydrogen halide is hydrochloric acid containing from about 1 to about 45 percent by weight hydrogen chloride.

7. The process of claim 5 wherein the aqueous solution of a hydrogen halide is hydrochloric acid containing from about 5 to about 25 percent by weight hydrogen chloride.

8. The process of claim 5 wherein the aqueous solution of a hydrogen halide is hydrochloric acid containing from about 10 to about 20 percent by weight hydrogen chloride.

9. The process of claim 5 wherein the aqueous solution of a hydrogen halide is hydrobromic acid containing from about 1 to about 70 percent by weight hydrogen bromide.

10. The process of claim 5 wherein the aqueous solution of a hydrogen halide is hydrobromic acid containing from about 20 to about 60 percent by weight hydrogen bromide.

11. The process of claim 5 wherein the aqueous solution of a hydrogen halide is hydrobromic acid containing from about 40 to about 48 percent by weight hydrogen bromide.

12. A process for the preparation of a beta-halogenopropionitrile which comprises reacting acrylonitrile with an aqueous solution of a hydrogen halide selected from the group consisting of hydrogen chloride and hydrogen bromide in the presence of an inert solvent selected from the group consisting of benzene, propionitrile, toluene, hexane, carbon tetrachloride, xylene and ethyl acetate and continuously removing water during the reaction as an acrylonitrile-water-solvent azeotrope.

13. The process of claim 12 wherein the inert solvent is benzene.

14. The process of claim 12 wherein the inert solvent is propionitrile.

References Cited

UNITED STATES PATENTS

| | | | |
|---|---|---|---|
| 1,851,040 | 3/1932 | Fikentscher et al. | 260—465.7 X |
| 2,231,838 | 2/1941 | Lichty | 260—465.7 X |
| 2,524,020 | 9/1950 | Moss | 260—465.7 |

LEWIS GOTTS, Primary Examiner

C. F. WARREN, Assistant Examiner